F. W. CARPENTER.
FEEDER ATTACHMENT FOR THRESHING MACHINES.
APPLICATION FILED MAY 25, 1908.
1,055,987.
Patented Mar. 11, 1913.
4 SHEETS—SHEET 1.
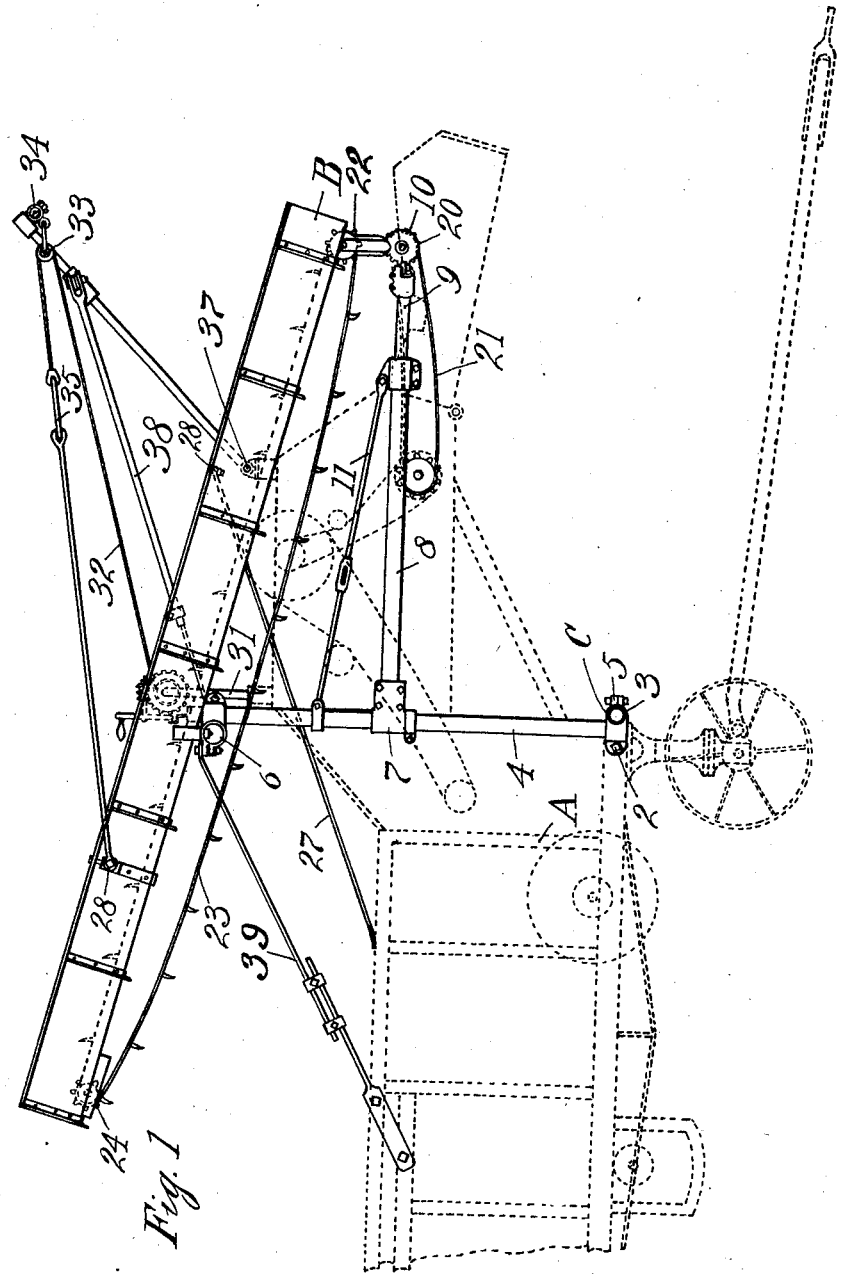
Witnesses,
George Voelker
Hattie Smith
Inventor,
Francis W. Carpenter
by Lothrop & Johnson
his Attorneys.

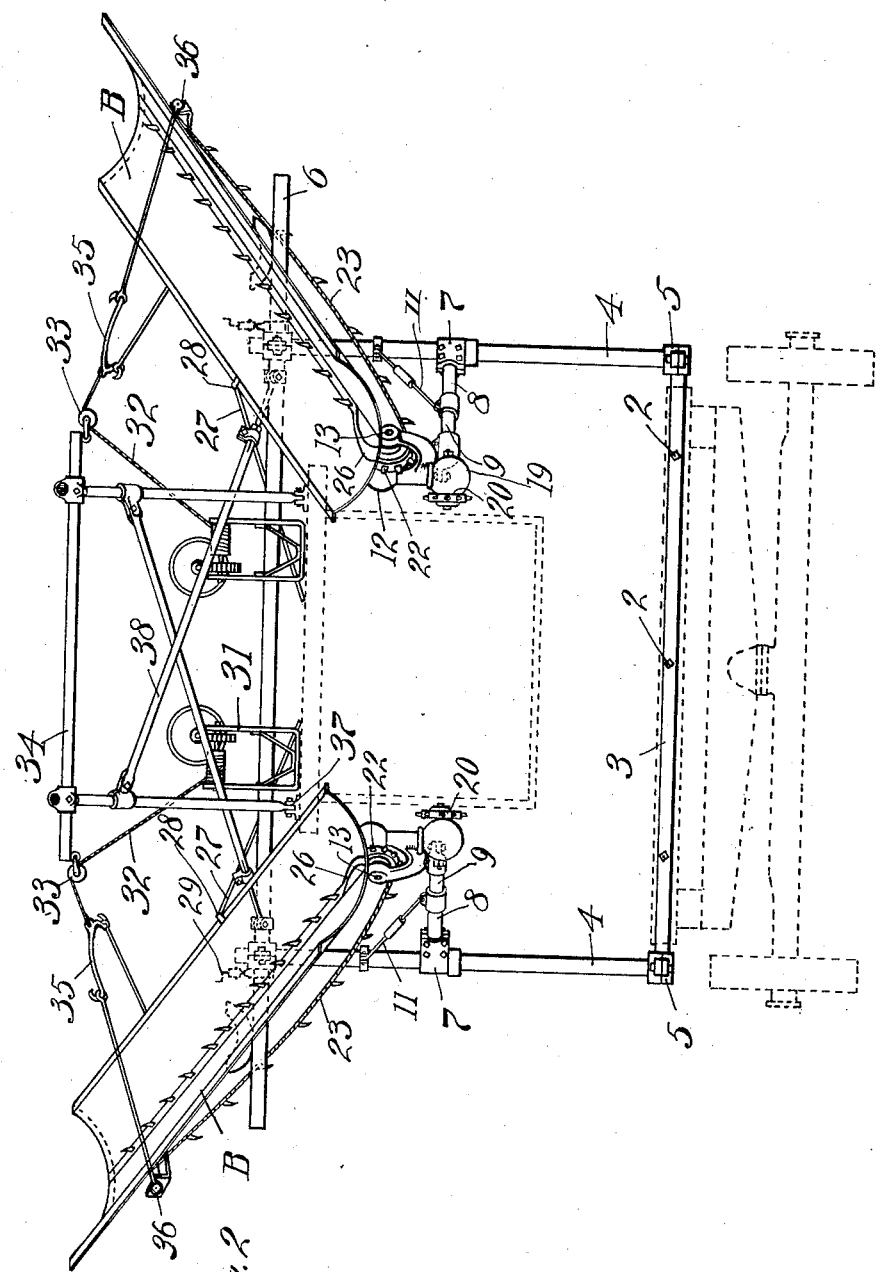

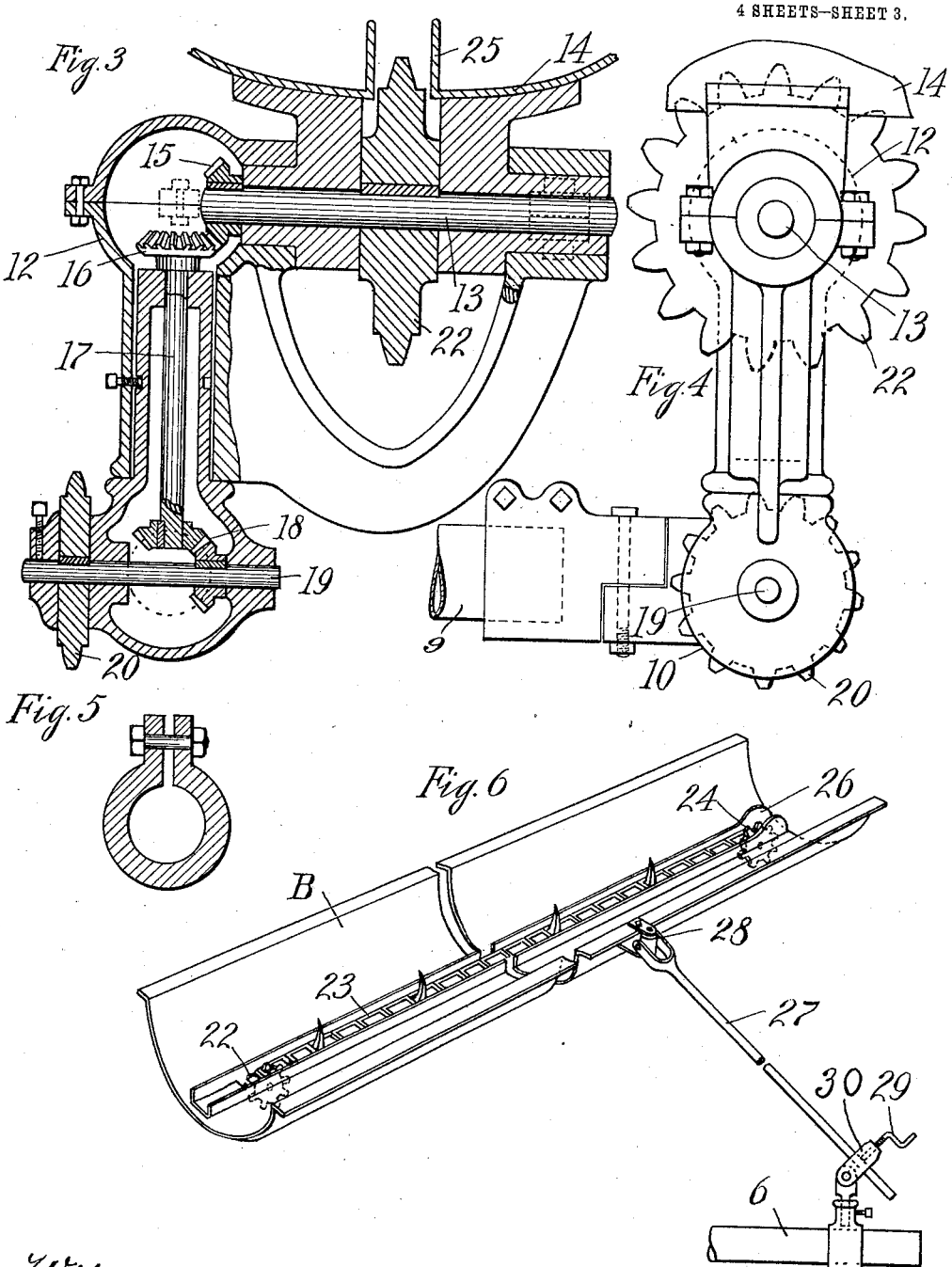

F. W. CARPENTER.
FEEDER ATTACHMENT FOR THRESHING MACHINES.
APPLICATION FILED MAY 25, 1908.
1,055,987.
Patented Mar. 11, 1913.
4 SHEETS—SHEET 4.
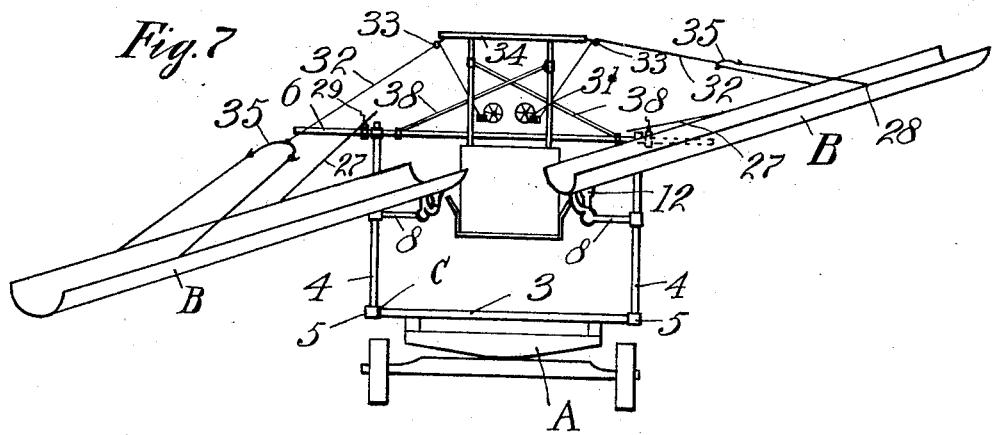
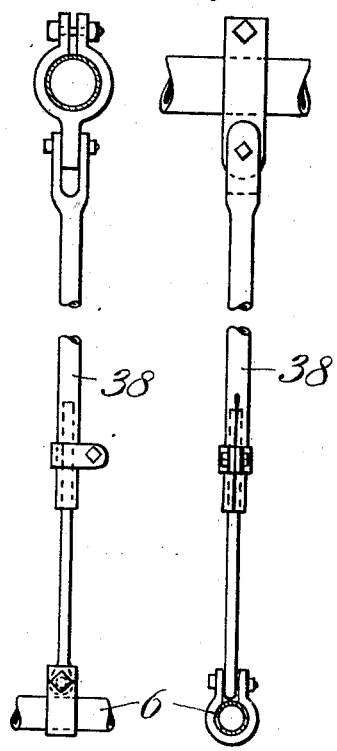
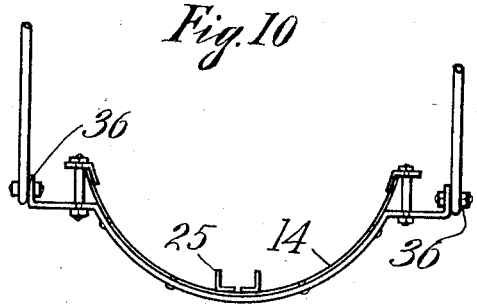
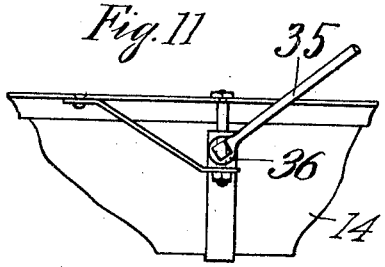
Witnesses,
George Voelker
Hattie Smith.
Inventor,
Francis W. Carpenter
by Lothrop & Johnson
his Attorneys.

UNITED STATES PATENT OFFICE.

FRANCIS W. CARPENTER, OF ST. PAUL, MINNESOTA.

FEEDER ATTACHMENT FOR THRESHING-MACHINES.

1,055,987.   Specification of Letters Patent.   Patented Mar. 11, 1913.

Application filed May 25, 1908. Serial No. 434,717.

*To all whom it may concern:*

Be it known that I, FRANCIS W. CARPENTER, a citizen of the United States, residing at St. Paul, in the county of Ramsey and State of Minnesota, have invented certain new and useful Improvements in Feeder Attachments for Threshing-Machines, of which the following is a specification.

My invention relates to improvements in wing carrier attachments for threshing machines.

Among the objects of the invention are to provide an attachment having lateral wing troughs, which attachment is adapted to be universally mounted upon threshing machines of present standard makes, and also to be easily attached thereto and detached therefrom.

The attachment is designed to support heavy troughs in a position free from the ground, and so that the troughs shall be capable of a wide range of adjustment upon the supporting part of such attachment.

To this end the attachment preferably consists of wing troughs with driving and supporting connections therefor supported upon the free ends of boom structures, means connecting the inner ends of the boom structures to the threshing machines so as to hold them in rigid relation therewith, and means for supporting the boom structures rigidly enough to overcome the strains and stresses caused particularly by the weight of the troughs and driving supports on the free ends of the boom structures, the attachment as a whole being adapted for support in connection with different types of feeders.

In an attachment of the class described in which very heavy troughs with driving and supporting connections are supported upon the free ends of the boom structures, and which is adapted for attachment to threshing machines of varying widths and heights of feeders, certain fundamental difficulties must be overcome, and this is accomplished by the particularly novel combinations covered in the claims.

My invention is an attachment adapted to be assembled at the factory for application to threshing machines containing feeders of different widths and heights, and then taken to the field and attached to the machine.

The attachment as a whole, including the troughs, embodies features whereby the boom structures, when attached, are held in rigid relation to the machine, and the driving supports of the troughs are supported so as to resist the exceptional strains and twists caused by the swinging of the heavy wing troughs upon the free ends of the long boom arms. A particular advantage is obtainable by the members common to the boom structures joining them and holding them in rigid relation and serving as a means of attachment to the front end of the threshing machine.

My attachment is essentially distinguished from those constructions in which feeder troughs are so supported as to form an integral structure with some particular type of feeder, and from those constructions in which the outer ends of the troughs rest upon the ground, and which, therefore, do not need the features and combination of elements necessary in the universally-adaptable attachment of the class described.

The invention consists further in the features of construction and combination of parts hereinafter particularly described, illustrated in the accompanying drawings, and pointed out in the appended claims.

In the accompanying drawings forming part of this specification, Figure 1 is a side elevation of the front end of a threshing machine shown fitted with my invention. Fig. 2 is a front elevation of the same. Figs. 3, 4 and 5 are detail views of supports for the conveyer. Fig. 6 is a perspective view of one of the conveyer troughs. Fig. 7 is a diagrammatic front elevation of the machine. Figs. 8 and 9 are detail views of adjusting rods forming part of the invention. Figs. 10 and 11 are end and fragmentary side views, respectively, of one of the conveyer troughs.

Referring to the drawings, A represents an ordinary threshing machine.

C represents an attachment frame which may be secured to the thresher in any suitable manner, as by means of bolts 2. The attachment frame consists essentially of a horizontal bar 3 through which the bolts 2 pass, and uprights 4 slidably supported on the ends of the bar by means of couplings 5. The upper ends of the uprights 4 are adjustably connected by a horizontal bar 6, which bar, as shown in Fig. 7, projects some distance beyond the side bars to form rests for the conveyers B when in the position shown in Fig. 1. Slidably supported upon the vertical bars 4 by means of sleeves 7, are horizontal arms or booms 8 slidably connected at their outer ends with extension arms 9 supporting elbows 10. The extension bars 9 have adjustable connection 11 with the sleeves 7. Rotatable upon the upwardly-extending portion of each elbow 10 is a yoke 12 forming a journal support for the inner end of the adjacent trough 14. A horizontal shaft 13 is journaled in the inner end of each conveyer trough, as shown in Fig. 3, and carries at one end a bevel pinion 15 which intermeshes with a similar pinion 16 upon an upright shaft 17. The lower end of this shaft has a bevel pinion connection 18 with a horizontal shaft 19, which, in turn, carries a sprocket-wheel 20 which is connected by a chain 21 with the driving mechanism. Secured upon the horizontal shaft 13 is a sprocket-wheel 22 connected by a conveyer chain 23 with a sprocket-wheel 24 in the outer end of the conveyer trough. The conveyer chain 23 preferably runs within a channel bar guide 25, the inner end of the guide 25 being formed with projecting flanges 26 to force the material away from the teeth of the chain. The booms 8, extension arms 9, sleeves 7, connections 11 and uprights 4, constitute boom structures, and upon the free end of each of these boom structures is supported the associated trough 14.

In order to swing the conveyers in horizontal planes I provide rods 27 each of which has a pivotal connection 28 with one side of its associated trough, each of the rods 27 being slidable through a block 30 having pivotal support, as shown in Fig. 6, on the bar 6, the rods 27 being held in adjusted positions in the blocks 30 by means of pins 29.

To swing the troughs in vertical planes I provide for each of the same a windlass 31 preferably supported upon the feeder and connected with the conveyer troughs by means of cables 32 running over idler pulleys 33 carried by a frame 34. The ends of the cables 32 are connected with bails 35, which bails have pivotal connection 36 with the sides of the troughs, as indicated in Figs. 10 and 11. The frame 34 has pivotal support 37 upon the feeder so as to swing toward and away from the frame which is constituted by the bar 3, the uprights 4, and the horizontal bar 6, and is connected to such bar 6 by adjustable bars 38.

That the frame which is made up of the bar 3, the uprights 4, and the bar 6 may be readily held after its application to the threshing machine, brace rods 39 are employed, said rods being connected to the bar 6, and anchored on the body of the machine A. The brace rods 39 impart rigidity to the frame, and serve to hold the latter in position to resist the strains and stresses imposed thereon incident to the weight of the wing conveyers B, and the material which the same convey.

It will be seen that the attachment is independent of the particular construction of threshing machine or feeder, and may be attached to or detached from machines embodying different styles of feeders without changing or affecting the construction of the feeder or machine.

The cross-bar 3 and couplings 5 constitute members joining the boom structures and holding them in rigid relation, and serve as a means of attachment to the front end of the threshing machine, and the cross-bar 6 in connection with the brace rods 39 and connected parts form means coöperative with said attachment parts to hold said boom structures in rigid supporting position to resist the strains and stresses imparted to the free ends of the boom structures by their suspended wing troughs. These features constitute an important part of the invention to accomplish the results desired, and may be structurally modified without departing from the idea of my invention.

In applying the invention to a threshing machine, the trough supporting framework having been adjusted to fit the particular type of feeder, driving chains of proper lengths will be fitted thereto, thus putting the apparatus in condition for operation without any further adjustments.

It will be further evident that I secure by means of my improved features of invention a construction which may be removably supported in connection with the feeder of a threshing machine and adjusted to fit varying sizes of feeder. After being set up and adjusted to the feeder the endless chains will be driven through the medium of the gears 20 which, as stated, may be properly connected with the driving mechanism of the machine and need not be adjusted after the mechanism is set up.

I claim:

1. The combination with a threshing machine and its feeding mechanism, of a frame supported thereby, said frame being adjustable to different widths of feeding mechanism, conveyer troughs arranged upon opposite sides of said frame, and means for swinging said troughs in vertical and horizontal planes.

2. The combination with a threshing machine and its feeding mechanism, of a frame adjustably supported in connection therewith, conveyer troughs having horizontal pivotal support upon opposite sides of said frame, said pivotal supports being horizontally adjustable with reference to said frame, and means for swinging said troughs in vertical and horizontal planes.

3. The combination with a threshing machine and its feeding mechanism, of a frame removably supported thereby, conveyer troughs having horizontal and vertical pivotal support upon opposite sides of said frame, and means for swinging said troughs in a vertical plane comprising a windlass support carried by said frame and horizontally adjustable with reference thereto, and a cable connected with said troughs and running over said windlass support.

4. In combination with a threshing machine and its feeding mechanism, a framework element arranged horizontally of and carried by said machine below the feeding mechanism, and conveyer troughs supported upon the ends of said frame element and adjustable thereon toward and from each other.

5. The combination with a threshing machine and its feeding mechanism, of a frame supported thereby, conveyer troughs having horizontal and vertical pivotal support upon opposite sides of said frame, means for swinging said troughs in vertical and horizontal planes, an endless chain carrier for each of said troughs, and freeing flanges 26 carried by the inner end of each trough upon opposite sides of its chain for the purpose set forth.

6. In combination with a threshing machine and its feeding mechanism, a framework element arranged horizontally of and carried by said machine below its feeding mechanism, conveyer troughs arranged upon the ends of said framework element and adjustable thereon toward and from the center of the machine, and means for raising and lowering the inner supported ends of said troughs.

7. In combination with a threshing machine and its feeding mechanism, a frame element arranged horizontally of, and supported by the machine, a pair of conveyer troughs, a framework for said troughs arranged at the ends of said frame element and horizontally adjustable toward and from the machine, and supplementary frame elements adjustably connecting said trough supporting framework from the machine.

8. The combination with a threshing machine and its feeder mechanism, of a pair of conveyer troughs, supporting framework for said troughs removably supported upon the threshing machine, said conveyer troughs having horizontal and vertical pivotal support upon opposite sides of said framework, and horizontally adjustable connections between the pivotal supports of said troughs and said framework whereby to allow said troughs to be adjusted transversely upon the machine.

9. In combination with a threshing machine and its feeding mechanism, a pair of troughs arranged upon opposite sides of the feeding mechanism, supporting framework for said troughs having horizontally adjustable support upon said machine below said feeding mechanism, said troughs being swingable in horizontal and vertical planes upon said framework, and supplementary brace rods for adjustably connecting said framework and machine.

10. The combination with a threshing machine and its feeding mechanism, of a pair of conveyer troughs, a framework forming a connecting support for said conveyer troughs and removably supported upon said machine, and adjustable to fit different widths of feeding mechanism, and means for swinging said conveyer troughs upon said framework in horizontal and vertical planes.

11. In combination with a threshing machine and its feeder mechanism, a framework element secured to said machine and extending outwardly at the sides thereof, and conveyer troughs supported on the outer ends of said framework element to swing in a horizontal plane with reference thereto, said troughs being horizontally adjustable on said element transversely of the machine.

12. In combination with a threshing machine and its feeder mechanism, a framework element carried by said machine, and conveyer troughs supported upon said element, and adjustable thereon toward and from each other in a line transverse of the machine and being swingable in horizontal and vertical planes.

13. In combination with a threshing machine and its feeder mechanism, a frame element carried thereby, conveyer troughs having horizontal and vertical pivotal supports upon said frame element at opposite sides of the machine, horizontally adjustable connections between said pivotal supports and said frame element, and means for swinging said troughs in vertical planes.

14. In combination with a threshing machine and its feeder mechanism, a frame element extending transversely of and supported by said machine, a pair of troughs, a supporting framework for said troughs arranged upon the ends of said frame element and adjustable thereon toward and from opposite sides of the machine.

15. The combination with a threshing machine and its feeder mechanism, of a pair of booms pivotally and removably supported upon opposite sides of said machine, means constituting an adjustable connection between the pivotally supported ends of said booms, said means being removably supported in relation to said machine and conveyer troughs supported upon said booms to swing in horizontal planes.

16. The combination with a threshing machine and its feeder mechanism, of a pair of booms, supporting means connecting the inner ends of the two booms, and being removably supported upon said machine below the feeder mechanism and means for horizontally adjusting said booms with respect to said supporting means and for holding said booms in adjusted positions.

17. The combination with a threshing machine and its feeder mechanism, of a pair of booms, means pivotally supporting said booms upon opposite sides of the feeder, said supporting means adjustably connecting said booms with respect to each other and being removably supported upon the machine below said feeder, and an adjustable connection between the free ends of the booms and the machine.

18. The combination with a threshing machine and its feeder mechanism, of a pair of booms, means for removably and adjustably supporting said booms at opposite sides of the feeder comprising frame elements adjustably connecting the inner ends of the booms, said frame elements being removably supported upon the machine, troughs mounted upon the free ends of said booms to swing in horizontal and vertical planes, and means for holding said booms in adjusted positions relative to said frame elements to vary the heights of the troughs.

19. In combination with a threshing machine and its feeder mechanism, of a pair of booms, means for supporting said booms on opposite sides of the feeder comprising frame elements adjustably connecting the inner ends of the booms, said frame elements being removably supported upon the machine below the feeder, troughs mounted upon the free ends of said booms to swing in horizontal and vertical planes, and means for securing said booms in adjusted positions relative to said frame elements to vary the height and horizontal positions of the supported ends of said troughs.

20. In combination with a threshing machine and its feeder mechanism, a pair of booms supported on opposite sides of said feeder mechanism, means connecting the supported ends of said booms, said booms and connecting means being removably supported upon the machine, and means for holding said booms in adjusted positions to bring their free ends into varying heights with relation to the feeder.

21. In combination with a threshing machine and its feeder mechanism, a pair of booms supported on opposite sides of said feeder mechanism, means connecting the supported ends of said booms, said booms and connecting means being removably supported upon the machine, troughs supported on the free ends of said booms, and means for independently securing said booms in adjusted positions with relation to said connecting means to vary the positions of said troughs.

22. In combination with a threshing machine and its feeder mechanism, a wing carrier comprising a trough provided at its inner end with a vertically disposed pivot, a socket bearing member adapted to receive said pivot, a boom adjustably supported upon said machine and at its free end supporting said socket bearing member, an attaching device for adjustably holding said member upon said boom, means on the machine for supporting said boom, and adjustable means for holding said boom in adjusted positions.

23. The combination with a threshing machine, of a supporting framework element associated therewith, a pair of conveyer troughs, pivotal supports for said troughs mounted upon said framework element and adjustable toward and away from each other in a line transversely of the machine, and means for holding said pivotal supports in transversely adjusted positions.

24. In combination with a threshing machine and its feeder mechanism, a boom, an attachment part removably supporting said boom upon one side of the machine, a conveyer trough mounted upon the free end of said boom to swing in horizontal and vertical planes, and means for positively adjusting said boom and holding the same in adjusted positions with respect to said removable attachment part to vary the height and horizontal position of the trough.

25. The hereindescribed universally-adaptable attachment for use in threshing machines and feeders, including a pair of wing troughs arranged one at each side of the machine, a boom structure associated with each of said troughs for sustaining the weight of the latter, means for holding the boom structures on the machine, and means for bracing the boom structures against the strains and stresses incident to the weight of the wing troughs and their loads.

26. The hereindescribed universally-adaptable attachment for use in threshing machines and feeders, including a pair of wing troughs arranged one at each side of the machine, a boom structure associated with each of said troughs, one end of said boom structure being mounted upon the machine, the other end of the boom structure supporting its associated trough, and means for bracing the boom structures against the strains and stresses incident to the weight of the wing troughs and their loads.

27. The hereindescribed universally-adaptable attachment for use in threshing machines and feeders, including a pair of wing troughs arranged one at each side of the machine, a boom structure associated with each of said troughs for sustaining the weight of the latter, attaching means for mounting the boom structures in supporting position upon the machine, means for holding the boom structures in fixed relation to the machine, and means for bracing the boom structures against the strains and stresses incident to the weight of the wing troughs and their loads.

28. The hereindescribed universally-adaptable attachment for use in threshing machines and feeders, including a pair of boom structures, means for mounting the same at opposite sides of the threshing machine and its feeder, a wing trough mounted upon each of said boom structures and adjustable in vertical and horizontal planes thereon, and means for bracing the boom structures against the strains and stresses incident to the weight of the wing troughs and their loads.

29. The hereindescribed universally-adaptable attachment for use in threshing machines and feeders, including a pair of wing troughs arranged one at each side of the machine, a boom structure associated with each of said troughs, the free end of the boom structure supporting the delivery end of the associated trough, the other ends of the boom structures being held in fixed relation to the machine, means for bracing the boom structures against the strains and stresses incident to the weight of the wing troughs and their loads, and means for supporting the feed ends of the wing troughs.

In testimony whereof I affix my signature in presence of two witnesses.

FRANCIS W. CARPENTER.

Witnesses:
  H. S. JOHNSON,
  HATTIE SMITH.

---

Copies of this patent may be obtained for five cents each, by addressing the "Commissioner of Patents, Washington, D. C."